United States Patent [19]

Hergenrother

[11] Patent Number: 4,510,296

[45] Date of Patent: Apr. 9, 1985

[54] PHENOXY RESINS CONTAINING PENDENT ETHYNYL GROUPS AND CURED RESINS OBTAINED THEREFROM

[75] Inventor: Paul M. Hergenrother, Yorktown, Va.

[73] Assignee: The United States of America as represented by the Administrator of the National Aeronautics and Space Administration, Washington, D.C.

[21] Appl. No.: 608,741

[22] Filed: May 10, 1984

[51] Int. Cl.³ ............................................. C08G 65/32
[52] U.S. Cl. .................................. 525/534; 525/532; 528/86
[58] Field of Search ................... 525/532, 534; 528/86

[56] References Cited

U.S. PATENT DOCUMENTS

| | | | |
|---|---|---|---|
| 3,931,093 | 1/1976 | Del Nero | 525/141 |
| 4,226,800 | 10/1970 | Picklesmier | 528/86 |
| 4,287,323 | 9/1981 | Tefertiller et al. | 525/532 |
| 4,314,032 | 2/1982 | Murayama et al. | 521/52 |

*Primary Examiner*—Lester L. Lee
*Attorney, Agent, or Firm*—Howard J. Osborn; John R. Manning; Wallace J. Nelson

[57] ABSTRACT

Phenoxy resins containing pendent ethynyl groups, the process for preparing the same, and the cured resin products obtained therefrom are disclosed. Upon the application of heat, the ethynyl groups react to provide branching and crosslinking with the cure temperature being lowered by using a catalyst if desired but not required. The cured phenoxy resins containing pendent ethynyl groups have improved solvent resistance and higher use temperature than linear uncrosslinked phenoxy resins and are applicable for use as coatings, films, adhesives, composited matrices and molding compounds.

11 Claims, No Drawings

PHENOXY RESINS CONTAINING PENDENT ETHYNYL GROUPS AND CURED RESINS OBTAINED THEREFROM

ORIGIN OF THE INVENTION

The invention described herein was made by an employee of the United States Government and may be manufactured and used by the Government for governmental purposes without the payment of any royalties thereon or therefor.

FIELD OF THE INVENTION

This invention relates to a new class of phenoxy resins having pendent ethynyl groups which lead to crosslinking upon heating to provide improved solvent resistance and higher use temperature than uncrossed phenoxy resins.

BACKGROUND OF THE INVENTION

Phenoxy resins of various molecular weights are commercially available for use in a variety of applications such as adhesives, coatings, moldings, and blow-molded bottles. Excellent reviews on phenoxy resins are available. For example, W. F. Hale, "Phenoxy Resins", *Encyclopedia of Polymer Science and Technology*, Vol. 10, p. 111 (1969) (edited by H. F. Mark, N. G. Gaylord and N. M. Bikales) and K. Neville, Ch. 2, "Phenoxy Resins", *New Linear Polymers*, p. 17, McGraw Hill Book Co., N.Y., 1967. Linear phenoxy resins are extremely sensitive to certain solvents and have a maximum operating use temperature under load of approximately 80° C. The solvent resistance and the use temperature of phenoxy resins have been improved as indicated in the literature by reacting pendent hydroxy groups with various crosslinking reactants such as anhydrides, epoxies and diisocyanates. The method for reacting phenoxy resins with various crosslinking agents varies. Generally the phenoxy resin is dissolved in a solvent and the crosslinking agent added to the solution. The shelf-life (stability) of the solution will vary depending upon the concentration and the nature of the crosslinking reagent. Limited shelf-life is a major problem using these crosslinking reagents and generally necessitates two-part systems. Other disadvantages of these crosslinking methods include significantly more difficult processing especially in injection and compression molding, higher moisture absorption due to hydrophilic polar sites, lower toughness, and lower thermal stability, particularly from diisocyanate crosslinking. There is thus a definite need in the art for phenoxy resins having pendent reactive crosslinking groups and improved shelf-life properties.

Accordingly, it is an object of the present invention to provide a new class of phenoxy resins having pendent ethynyl groups.

Another object of the present invention is to provide a new class of phenoxy resins that have improved shelf-life properties.

Another object of the present invention is a phenoxy resins class that crosslinks upon the application of heat to yield a cured resin having improved solvent resistance and higher use temperature that linear uncrosslinked phenoxy resins.

A further object of the present invention is a novel phenoxy resin having improved processability, toughness, solvent resistance and increased use temperature and the process for preparing same.

According to the present invention the foregoing and additional objects are attained by reacting phenoxy resins with ethynyl-substituted aryl acid chlorides such as 4-ethynylbenzoyl chloride to provide pendent ethynyl crosslinking groups to the phenoxy resin. The ethynyl content can be readily controlled simply by altering the amount of 4-ethynylbenzoyl chloride used in the reaction or by co-reaction of the pendent hydroxy groups on the phenoxy resins with mixtures of the ethynyl-substituted aryl acid chloride and other acid chlorides, e.g., benzoyl chloride. In controlling the ethynyl content, the crosslink density of the cured resin can be cured accordingly. Also, if desired, residual hydroxy groups can be left in the phenoxy resin without encountering any major disadvantages. High ethynyl content provides high crosslink density in the cured resins. Also, the properties of solvent resistance, processability and toughness are controlled by the ethynyl content and accordingly, the crosslink density. Phenoxy resins containing high ethynyl content are more difficult to process than those with lower ethynyl content. Conversely, the higher the ethynyl content, the better the solvent resistance of the cured resin. The synthesis of phenoxy resins containing pendent ethynyl groups can be readily controlled to adjust the properties of the cured resins for specific applications.

Phenoxy resins are relatively high molecular weight amorphous engineering thermoplastics synthesized from the reaction of diphenols and epichlorohydrin using a strong base. An exemplary phenoxy resin used in the specific examples described is PKHH, a commercial product available from the Union Carbide Corporation and has the following chemical structure:

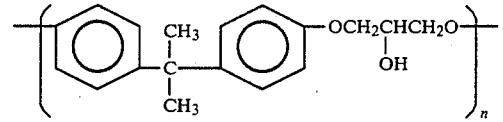

where n=20–200 repeating units.

Linear phenoxy resins are reported in the literature as having good toughness, relatively high modulus, moderate thermal stability, excellent moldability, high abrasion resistance and good adhesive strength. The major uses for linear phenoxy resins are as molding materials, coatings and adhesives. The chemical resistance of a phenoxy resin is dictated by the chemical structure and the amorphous nature of the polymer. These resins are resistant to acids and bases but soluble or become swollen in polar solvents such as ketones, esters, and chlorinated hydrocarbons. To alleviate this problem and gain better weathering characteristics, several approaches have been utilized to crosslink these resins, such as the pendent hydroxyl groups having been crosslinked by anhydrides, diisocyanates, urea- and melamine-formaldehyde resins. These methods usually employ two component systems and produce polymers that are unstable in solution. The present invention, however, modifies a phenoxy resin by incorporating a thermally reactive ethynyl group pendent to the polymer chain resulting in a polymer that can be crosslinked when heated to produce a material having improved solvent resistance and higher softening temperature. By controlling the quantity of ethynyl groups the processability of phenoxy resins is affected as well as the cured resin solvent resistance and glass transition temperature or use temperature. The 4-ethynylbenzoyl chloride employed in the present invention was obtained by reacting methyl-4-bromobenzoate with trimethylsilylacetylene using a palladium catalyst and the trimethylsilyl group was subsequently cleaved with potassium carbonate. After saponification, the carboxylic acid was converted to the acid chloride as previously reported in the *Journal of Polymer Science, Polymer Chemistry Edition*, 20, 3131 (1982). 4-ethynylbenzoyl chloride was obtained as a yellow crystalline solid, m.p. 75°–76° C. after recrystallization from hexane.

A more complete description of the preparation of the 4-ethynylbenzoyl chloride is found in Hergenrother's U.S. Pat. No. 4,431,761, issued Feb. 14, 1984.

Generally, to attach the pendent ethynyl groups onto the phenoxy resins according to the present invention, 4-ethynylbenzoyl chloride or a mixture of benzoyl chloride and 4-ethynylbenzoyl chloride was added to a solution of the phenoxy resin, e.g., PKHH, (Union Carbide Corporation) containing a small amount of triethylamine. After stirring overnight, the polymer was precipitated in methanol, boiled in fresh methanol, and dried in vacuo at 80° C. to recover an off-white solid. The recovered polymers were dissolved in $CHCl_3$ and stirred to assure thorough mixing. The resulting blends were then air dried at ambient temperature for eighteen hours and subsequently dried at 70° C. for four hours. To obtain films polymer solutions were made in $CHCl_3$ (20% weight/volume) and doctored onto plate glass, stage dried in a circulating air over to a final temperature of 250° C. and held for one-half hour at 250° C.

Having generally described the invention, a more complete understanding thereof can be obtained by reference to the following specific examples which are provided herein for purposes of illustration only and are not to be limiting on the invention.

EXAMPLE I

Preparation of Phenoxy Resin Containing 66 Mole % Pendent 4-Ethynylbenzoyloxy and 34 Mole % of Pendent Benzoyloxy Groups Phenoxy resin (Union Carbide Corporation's PKHH, number average molecular weight=24,000 g/mole, dried in vacuo at 100° C. for eighteen hours) (5.0 g, 0.208 mmole or 17.6 mmole of pendent hydroxy groups) was dissolved in methylene chloride (100 ml) and triethylamine (4 ml) under a nitrogen atmosphere. 4-Ethynylbenzoyl chloride (1.92 g, 11.7 mmole) was added and the reaction mixture was stirred at ambient temperature for 0.5 hour. Excess benzoyl chloride (3.5 g, 25 mmole) was added and the reaction mixture stirred for six hours at ambient temperature under nitrogen. The light orange solution was poured slowly into methanol with stirring to precipitate an off-white solid. The solid was boiled in fresh methanol and dried at 70° C. for one hour to yield 6.9 g (97% yield) of off-white polymer. Analysis by differential scanning calorimetry (DSC) showed a transition at 95° C. characteristic of a second order or glass transition temperature (Tg) and an intense exotherm beginning at approximately 150° C. and peaking at 277° C. due to reaction of the pendent ethynyl groups. Upon heating the sample to 300° C. in static air in the DSC, quenching and rerunning the same sample, a Tg of 134° C. was observed with no indication of residual exotherm. Upon heating the same sample at 300° C. for 15 minutes, quenching and rerunning, a Tg of 144° C. was obtained. A film was prepared by casting a chloroform solution (20% solids, weight to volume) onto plate glass and air drying for one hour and stage-drying for 0.5 hour at 80°, 150°, 200° and 250° C. in air. The transparent yellow film was flexible and insoluble in chloroform although slight swelling was observed.

EXAMPLE II

Preparation of Phenoxy Resin Containing 34 Mole % of Pendent 4-Ethynylbenzoyloxy and 66 Mole % of Pendent Benzoyloxy Groups Phenoxy resin (Union Carbide Corporation PKHH, number average molecular weight=24,000 g/mole, dried in vacuo at 100° C. for eighteen hours) (2.5 g, 0.104 mmole or 8.8 mmole of pendent hydroxy groups) was dissolved in methylene chloride (50 ml) and triethylamine (3 ml) under nitrogen. 4-Ethynylbenzoyl chloride (0.48 g, 2.9 mmole) was added and the reaction mixture was stirred at ambient temperature for 0.5 hour. Excess benzoyl chloride (3.0 g, 21 mmole) was added and the reaction mixture was stirred for eighteen hours at ambient temperature under nitrogen. The light yellow solution was poured into methanol with stirring to precipitate an off-white solid. The solid was boiled in fresh methanol and dried at 70° C. in air to yield 3.2 g of off-white polymer. The DSC (heating rate of 20° C./minute) showed a Tg of 90° C. and a strong exotherm, peaking at 303° C. After heating a sample in the DSC at 300° C. in air for 15 minutes, quenching and rerunning, a Tg at 110° C. was apparent. A film was prepared by casting a chloroform solution onto plate glass and stage-drying through 0.5 hour at 250° C. The transparent yellow film was flexible and insoluble in chloroform although swelling was observed.

EXAMPLE III

Preparation of Phenoxy Resin Containing 100 Mole % of Pendent 4-Ethynylbenzoyloxy Groups Phenoxy resin (Union Carbide Corporation's PKHH, number average molecular weight=24,000 g/mole) (2.5 g, 0.104 mole, or 8.8 mmole of pendent hydroxy groups) was dissolved in methylene chloride (50 ml) and triethylamine (3 ml) under nitrogen. 4-Ethynylbenzoyl chloride (3.0 g, 18.3 mmole) was added and the reaction mixture was stirred for eighteen hours at ambient temperature under nitrogen. The yellow solution was boiled in fresh methanol and subsequently dried at 70° C. in air to yield 3.2 g of off-white polymer. The DSC (Heating rate of 20° C./minute) showed a Tg at 102° C. and a strong exotherm peaking at 257° C. After heating a sample at 300° C. for 15 minutes in air, quenching and rerunning the same sample, no Tg was detected by DSC. A film of the polymer was transparent orange, very brittle, and insoluble in chloroform.

Various ones of these modified polymers are defined in the equation below and identified therein as polymers 2 through 7. The characterization of polymers 2 through 7 is given in Table I.

PREPARATION OF POLYMERS
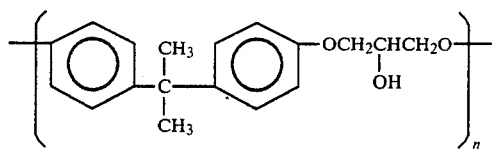
(POLYMER NO. 1)     where n = 20–200 repeat units.
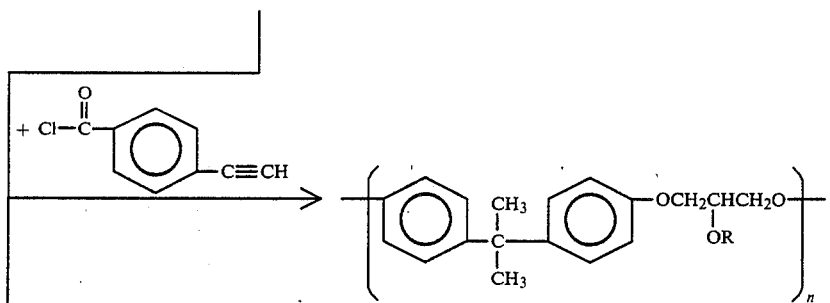
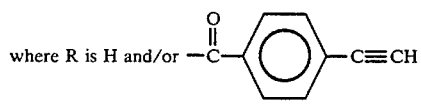
(POLYMER NO. 2 and 3)
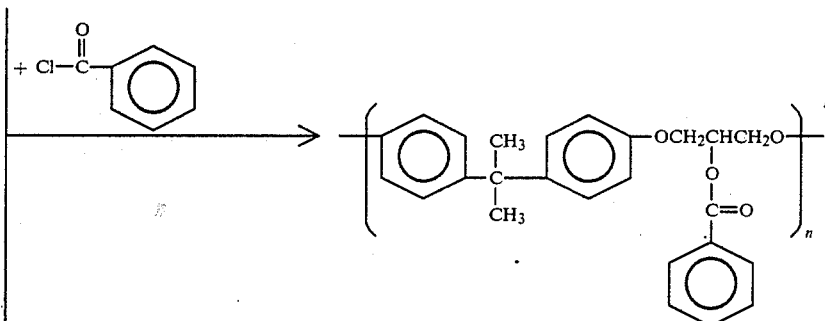
(POLYMER NO. 4)
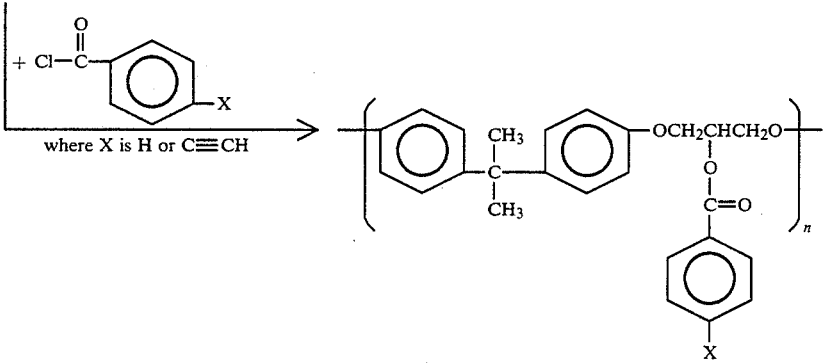
where X is H and C≡CH
(POLYMER NO. 5, 6 and 7)
(SEE TABLE 1)
TABLE I
Composition and Characterization of Polymers
| Polymer No. (See Equation) | Composition (See Equation) where R = | | | $\eta$inh, dl/g[1] | GPC Peak Retention Time, min[2] | Film Flexibility |
|---|---|---|---|---|---|---|
| | Mole % H | Mole % OC—$C_6H_5$ | Mole % OC—$C_6H_5$—C≡CH | | | |
| 1[3] | 100 | 0 | 0 | 0.40 | 17.48[4] | Fingernail |

TABLE I-continued

Composition and Characterization of Polymers

| Polymer No. (See Equation) | Composition (See Equation) where R = | | | $\eta$inh, dl/g[1] | GPC Peak Retention Time, min[2] | Film Flexibility |
|---|---|---|---|---|---|---|
| | Mole % H | Mole % OC—C$_6$H$_5$ | Mole % OC—C$_6$H$_5$—C≡CH | | | |
| 2 | 66 | 0 | 34 | 0.42 | 17.31 | Creaseable Flexible |
| 3 | 0 | 0 | 100 | 0.52 | 17.34 | Brittle |
| 4 | 0 | 100 | 0 | 0.48 | 17.31 | Fingernail Creaseable |
| 5 | 0 | 90 | 10 | 0.46 | 17.33 | Fingernail Creaseable |
| 6 | 0 | 66 | 34 | 0.48 | 17.25 | Flexible |
| 7 | 0 | 34 | 66 | 0.47 | 17.30 | Flexible |

[1]Inherent viscosity of 0.5% solution in chloroform at 25° C.
[2]Gel-permeation (size exclusion) chromatography using a bank of $\mu$-Styragel Columns (10$^6$, 10$^5$, 10$^4$, 10$^3$Å) and chloroform as solvent
[3]Commercially available phenoxy resin from Union Carbide Corporation (PKHH)
[4]Number average molecular weight - 24,000 g/mole The characterization procedure employed to obtain the results tabulated above involved obtaining the inherent viscosity on 0.5% solutions in CHCl$_3$ at 25° C. Gelpermeation (size exclusion) chromatography was performed on a Waters Associates ALC/GPC 244 liquid chromatograph in CHCl$_3$ using $\mu$-Styragel columns (10$^6$, 10$^5$, 10$^4$, 10$^3$ Å), an ultraviolet detector (254 nm) and a flow rate of 2 ml/min. Differential scanning calorimetric (DSC) curves were obtained with a DuPont Model 990 Thermal Analyzer in combination with a standard DSC cell. Each sample was run in static air at a heating rate of 20° C./min with the apparent glass transition temperature (Tg) taken at the inflection point of the $\Delta$T versus temperature curve. Torsional braid analyses (TBA) were conducted at a heating rate of 3° C./min in a nitrogen atmosphere over the temperature range of $-100$° to 300° C. Heat-up and cool-down curves were obtained on the same samples. Film solubilities were performed by soaking samples in CHCl$_3$ for eighteen hours. Relative processability was studied by placing dried polymer between two pieces of Kapton ® (DuPont) film, introducing into a preheated press, applying pressure and holding 10 minutes. Relative flow was rated by visual observation.

As shown in the equation above, seven different phenoxy resins with various pendent groups were synthesized. The composition of the various polymers is shown in Table I. Polymer 1 is PKHH, the commercial phenoxy resin obtained from Union Carbide Corporation. Polymer 2 contains 34% pendent ethynyl benzoyl groups and 66% residual hydroxy groups. The remaining polymers shown in Table I (polymers 3–7) have no residual hydroxy groups. Polymers 3, 4, 5, 6 and 7 contain 100%, 0%, 10%, 34% and 66% 4-ethynylbenzoyloxy groups, respectively, while the remaining reactive sites were substituted with benzoyloxy groups. Inherent viscosity ($\eta_{inh}$), GPC and film flexibility data are provided in Table I. Viscosities were as expected, with PKHH having the lowest value (0.40 dl/g) since no pendent hydroxy groups are substituted with larger groups. Polymer 2, which has 34% of the original hydroxy groups substituted, was slightly higher in viscosity than PKHH. The remaining polymers had similar viscosities, slightly higher than polymer 2, with polymer 3 having the highest viscosity at 0.52 dl/g. GPC peak retention times for all polymers except polymer 1 were very similar. Polymer 1 had the highest GPC peak retention time and, therefore, had the smallest average molecular size. These data were again predictable since this polymer has no substituent on the pendent hydroxy groups.

The last column in Table I concerns film flexibility. Cured films from polymers, 1, 4 and 5 are fingernail creaseable and relatively tough. Cured films from polymers 2, 6 and 7 are flexible but not fingernail creaseable. Polymer 3 formed a brittle film when cured to 250° C. This decrease in flexibility and toughness corresponds with an increasing amount of pendent ethynyl group substitution, indicating that the ethynyl groups reacted upon heating to provide polymers with increasing amounts of crosslinking.

Additional evidence for this interpretation is provided in Table II.

TABLE II

Thermal and Solubility Data of Polymer

| Polymer (from Table I) | DSC Data, °C.[1] | | | TBA Data, °C.[2] | | Chloroform Solubility of Cured Resin[3] |
|---|---|---|---|---|---|---|
| | Initial Tg | Exothermic Peak | Final Tg[4] | Heat-up Tg | Cool-down Tg | |
| 1 | 100 | none | 101 | 99 | 101 | Soluble |
| 2 | 104 | 293 | 122 | 90 | 128 | Moderate Swelling |
| 3 | 102 | 257 | ND[6] | 92 | 235 | Insoluble |
| 4 | 87 | none | 88 | 82 | 87 | Soluble |
| 5 | 88 | 320 | 91 | 82 | 91 | Pronounced Swelling |
| 6 | 90 | 303 | 110 | 88 | 110 | Moderate Swelling |
| 7 | 95 | 277 | 144 | 89 | 150 | Slight |

TABLE II-continued
Thermal and Solubility Data of Polymer

| Polymer | DSC Data, °C.[1] | | | TBA Data, °C.[2] | | Chloroform Solubility of Cured |
|---|---|---|---|---|---|---|
| (from Table I) | Initial Tg | Exothermic Peak | Final Tg[4] | Heat-up Tg | Cool-down Tg | Resin[3] |
| | | | | | | Swelling |

[1] Differential scanning calorimetry at a heating rate of 20° C./min
[2] Torsional braid analysis at a heating rate of 3° C./min
[3] Determined on thin films
[4] After curing for 15 min at 300° C. in static air
[5] After heating to 300° C. in nitrogen
[6] Not detected Both DSC and TBA data provide apparent Tgs. The first column under DSC data in this Table is the initial Tg, the second column is the exothermic peak temperature due to the reaction of the ethynyl groups and the third column provides the Tg after curing for 15 minutes at 300° C. Initial Tgs decreased slightly when the benzoyloxy group was substituted for the hydroxyl group and increased slightly when the 4-ethynylbenzoyloxy group was substituted for the hydroxyl group. No exothermic peaks were present for the polymers containing no ethynyl groups (numbers 1 and 4). For the polymers containing ethynyl groups, (numbers 2, 3, 5, 6 and 7) exothermic peak temperature decreased and the intensity increased as the ethynyl group content increased. The final Tgs correspond to the amount of ethynyl group present with higher Tgs for higher ethynyl content. Polymers without pendent ethynyl groups (numbers 1 and 4) displayed essentially no increase in the Tg after cure. TBA data is similar to DSC data, following the trend of higher Tg with increasing pendent ethynyl group content.

Cured films were tested for solubility in CHCl$_3$ and the resulting data are shown in the last column of Table II. Polymers 1 and 4 are uncrosslinked and soluble. At the other extreme, polymer number 3 is highly crosslinked and insoluble. The remaining polymer films swelled in CHCl$_3$ with increased swelling corresponding to decreased ethynyl content and crosslink density.

The processability of polymers 1–7 was compared by the simple method described hereinbefore. The press was preheated to 125° C., five polymers between Kapton ® film were inserted, a pressure of 100 lbs was applied and held for 10 minutes. Polymers (e.g., polymers 1, 2 and 5) with good flow formed transparent discs. Other polymers flowed partially but still had some fibrous material present (polymers 4, 7, 6 and 3 in order of decreasing amount of flow). There is a trend in polymers 1–7, where increasing ethynyl content decreases polymer flow. Thus, the commercially available phenoxy resin (PKHH) was systematically modified by reacting with various amounts of 4-ethynylbenzoyl chloride and benzoyl chloride to provide a series of phenoxy resins containing different amounts of pendent ethynyl groups. This systematic change in ethynyl group content provided a corresponding change in polymer properties. As the ethynyl group content increased, film flexibility decreased, final Tg and solvent resistance increased. The modified resins, maintaining the excellent processability of PKHH, exhibited good flow under relatively mild conditions. The crosslink density of these systems was systematically controlled by the incorporation of ethynyl groups.

Although the invention has been described relative to specific exemplary phenoxy resins, it is not so limited and the general concept of the invention can be extended to other phenoxy resins and to any soluble polymer containing groups such as OH, NH$_2$, NHR, SH, etc., that are capable of reacting with an acid chloride. The major requirement is that the parent polymer be stable at the temperatures required to effect reaction of the ethynyl groups. Specific examples of polymers that can be modified by this route include polyvinyl alcohol, cellulose, phenolic novolacs, polymeric amines and poly-p-hydroxysterene.

These and other variations and modifications of the present invention will be readily apparent to those skilled in the art without departing from the spirit or scope of the invention as set forth in the appended claims. It is therefore to be understood that the invention may be practiced otherwise than as specifically described.

What is claimed as new and desired to be secured by Letters Patent of the United States is:

1. A phenoxy resin composition having long shelf-life and undergoes branching and crosslinking upon the application of heat to yield a cured product having improved solvent resistance and high use temperature and formed as the reaction product of a phenoxy resin having the general formula of

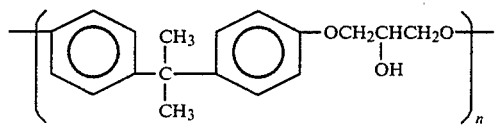

where n=20–200 repeating units and at least 10 mole % of an ethynyl-substituted aryl acid chloride.

2. The phenoxy resin composition of claim 1 wherein said ethynyl-substituted aryl acid chloride is 4-ethynylbenzoyl chloride.

3. The phenoxy resin composition of claim 1 including said ethynyl-substituted aryl acid being mixed with benzoyl chloride.

4. The phenoxy resin of claim 3 wherein said ethynyl substituted aryl acid is 4-ethynylbenzoyl chloride.

5. The phenoxy resin composition of claim 1 wherein the ethynyl substituted aryl acid chloride consists of 10–100 mole % of 4-ethynylbenzoyl chloride.

6. The phenoxy resin composition of claim 5 including 34–90 mole % of benzoyl chloride mixed with said 4-ethynylbenzoyl chloride.

7. A process for preparing an improved phenoxy resin composition having pendent ethynyl groups which crosslink upon heating to provide improved solvent resistance and higher use temperature than uncrossed or linear phenoxy resins comprising the steps of:
providing a phenoxy resin having the general formula of

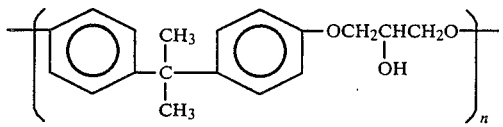

(where n=20–200 repeating units) in a solution of methylene chloride and triethylamine, adding a quantity of at least 10 mole % 4-ethynylbenzoyl chloride to the solution with stirring, precipitating the resultant with methanol to recover an off-white solid, boiling the recovered solid in fresh methanol to recover the off-white polymer.

8. The process of claim 7 wherein in addition to the quantity of 4-ethynylbenzoyl chloride added to the phenoxy resin solution, a quantity of at least 34 mole % benzoyl chloride is also added to the phenoxy resin solution.

9. The process of claim 8 wherein the ratio of 4-ethynylbenzoyl chloride and benzoyl chloride is varied to yield a final phenoxy resin composition having 10–100 mole % of 4-ethynylbenzoyl chloride and 34–90 mole % of benzoyl chloride.

10. The process of claim 7 including the further step of dissolving the recovered off-white polymer in a chloroform solution, 20% polymer weight to volume, casting this solution onto plate glass and air drying the cast film in incremental increased temperature stages to recover a transparent yellow polymer film.

11. The process of claim 10 wherein increased temperature stages are at temperatures of 80°, 150°, 200° and 250° C. with each said stage being of one-half hour duration.

* * * * *